(12) United States Patent
Knowles

(10) Patent No.: US 6,442,958 B1
(45) Date of Patent: *Sep. 3, 2002

(54) FLUID DELIVERY APPARATUS AND METHOD

(75) Inventor: Steven M. Knowles, Silver Lake, IN (US)

(73) Assignee: Bright Solutions, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/899,865

(22) Filed: Jul. 9, 2001

Related U.S. Application Data

(63) Continuation-in-part of application No. 09/732,916, filed on Dec. 11, 2000, which is a continuation-in-part of application No. 09/316,726, filed on May 21, 1999, now Pat. No. 6,196,016.

(51) Int. Cl.[7] .................................................. F25B 45/00
(52) U.S. Cl. .................................. 62/292; 62/77; 141/1; 141/382
(58) Field of Search ........................ 62/292, 77; 141/1, 141/382

(56) References Cited

U.S. PATENT DOCUMENTS

| | | |
|---|---|---|
| 1,716,482 A | 6/1929 | Bradbury |
| 1,926,399 A | 9/1933 | Neilsen |
| 1,984,865 A | 12/1934 | Creveling |
| 2,240,870 A | 5/1941 | Starr |
| 2,328,363 A | 8/1943 | Sundholm |
| 3,717,008 A | 2/1973 | Bandy |
| 3,795,262 A | 3/1974 | Post ............................ 141/1 |
| 3,799,406 A | 3/1974 | St. John et al. |
| 4,197,884 A | 4/1980 | Maran |
| 4,467,620 A | 8/1984 | Bradley et al. ............... 62/292 |
| 4,681,524 A | 7/1987 | Ikeda et al. |
| 4,698,983 A | 10/1987 | Hechavarria |
| 4,938,063 A | 7/1990 | Leighley ..................... 73/40.7 |
| 4,940,520 A | 7/1990 | Dowzall et al. |
| 4,948,016 A | 8/1990 | Summons et al. |
| 5,027,605 A | 7/1991 | Hardesty ....................... 62/77 |
| 5,170,632 A | 12/1992 | Reilly, Jr. et al. ............... 62/77 |
| 5,336,065 A | 8/1994 | Tieken |
| 5,363,665 A | 11/1994 | Sundman |
| 5,363,666 A | 11/1994 | Tieken |
| 5,375,425 A | 12/1994 | Cobb |
| 5,444,988 A | 8/1995 | Eden ........................... 62/125 |
| 5,540,254 A | 7/1996 | McGowan et al. |
| 5,673,722 A | 10/1997 | Brass |
| 5,699,678 A | 12/1997 | Trigiani ....................... 62/292 |
| 5,826,636 A | 10/1998 | Trigiani ..................... 141/382 |
| 5,967,204 A | 10/1999 | Ferris et al. |
| 6,029,720 A | 2/2000 | Swinford |
| 6,050,310 A | 4/2000 | Trigiani ..................... 141/382 |
| 6,056,162 A | 5/2000 | Leighley ..................... 222/156 |
| 6,155,066 A | 12/2000 | Chandler et al. |
| 6,186,197 B1 | 2/2001 | Trigiani |

OTHER PUBLICATIONS

Instructions for Fluorescent Tracer Dye Injection Tool with illustrations "A"–"F" (undated).
Instructions for Bright Solutions, Inc. Ratchet Gun UV Dye Delivery System (Nov. 1, 1998).
Instructions for Robinair Oil/Dye Injector #61566RA.

(List continued on next page.)

Primary Examiner—William Doerrler
Assistant Examiner—Mark Shulman
(74) Attorney, Agent, or Firm—Fish & Richardson P.C.

(57) ABSTRACT

A fluid delivery apparatus provides for controlled delivery of fluids into a fluid system. The fluid delivery apparatus can allow a defined volume of fluid to be delivered to the fluid system cleanly, minimizing fluid waste and spillage. The fluid delivery apparatus can provide a mechanical advantage allowing the fluid to be delivered easily and efficiently to a pressurized fluid system. The apparatus can have a piston and handle arrangement that can reduce wear of the apparatus.

40 Claims, 4 Drawing Sheets

OTHER PUBLICATIONS

Advertisement for Models 16256 and 16258 Syringe–Type Oil Injectors (undated).

Advertisement for Pro–Set® Oil Injectors.

Advertisement for Viper–Eyes™ Model 471600 Injector Gun Assembly (undated).

Advertisement for Spotgun® Injection System (undated).

Catalog page describing EZ–JECT® Multi–Dose Dye Injection System Kits (undated).

Catalog page showing Tracerline® Product No. TP–3880 dye injector (undated).

Advertisement for Tracerline® TP–3887 Universal Connector Set (Dec. 1995).

Catalog page showing Bayco due injector models SL–114, SL–114A, SL–116, SL–115, SL–115A, SL–117, SL–122, SL–123, and SL–124.

Internet advertisement for Cliplight injector model 701, 703 and 710 (Nov. 14, 1997).

"*Find Leaks Fast With The Tracker!*", Robinair Catalogue, © Robinair Division SPX Corporation, SA 792 (5/96), May, 1996.

"*Hand Turn Dye Injectors*", Classic Tool Design Inc. Catalogue © 1995 by Classic Tool Design Inc., 1995.

"*A/C Leak Detection: The Next Generation*", Viper Catalogue, Minneapolis, MN 00–996989 10/97, Oct., 1997.

FLUID DELIVERY APPARATUS AND METHOD

CLAIM OF PRIORITY

This application is a continuation-in-part of U.S. patent application Ser. No. 09/732,916, filed on Dec. 11, 2000, the entire contents of which are hereby incorporated by reference which is a continuation-in-part-of Ser. No. 09/316,726, filed on May 21, 1999, now U.S. Pat. No. 6,196,016.

TECHNICAL FIELD

This invention relates introducing fluid into a fluid system.

BACKGROUND

Leak detection additives can be used to detect leaks in fluid systems, such as climate control systems, hydraulic systems, engine oil systems, automatic transmission systems, fuel systems, brake systems, or radiator coolant systems. Climate control systems include heating, cooling, ventilating, and air conditioning systems. Some leak detection additives are emissive substances such as, for example, fluorescent or phosphorescent dyes. Suitable leak detection additives used in climate control systems include naphthalimide dyes, perylene dyes, thioxanthane dyes, coumarin dyes, or fluorescein dyes. Leaks can be detected by observing light emission from the dye at leak sites by exciting the dye with a light source having suitable wavelength or intensity. In general, the dyes fluoresce brightly when excited by light in the 190 to 700 nanometer wavelength range.

A variety of systems have been developed to introduce leak detection dyes into air conditioning systems. For example, previous injector designs include flow chamber systems and syringe-type systems for introducing liquid dyes into the system. A flow-chamber system generally has a reservoir into which a leak detection dye solution is poured or a dye capsule is loaded and sealed. A carrier is then passed through the reservoir to transport the dye into the system. A syringe-type system generally has a chamber that is loaded by pouring the leak detection dye into the chamber or is preloaded by the manufacturer. The dye is then forced from the chamber into the closed system. Other injector systems include mist diffusers.

SUMMARY

In general, a fluid delivery apparatus is a device that provides for controlled delivery of fluids into a fluid system. The fluid delivery apparatus can allow a defined volume of fluid to be delivered to the fluid system cleanly, minimizing fluid waste and spillage. The fluid delivery apparatus can provide a mechanical advantage allowing the fluid to be delivered easily and efficiently to a pressurized fluid system, which can have a pressure of 100 psi or greater, for example 150 psi. The apparatus can have a piston and handle arrangement that can reduce wear of the apparatus.

In one aspect, an apparatus for adding fluid to a fluid system includes a body having a cavity, an output port fluidly connected to the cavity, an input port fluidly connected to the cavity by a channel, and a piston orifice fluidly connected to the cavity. The apparatus also includes a piston extending into the cavity through the piston orifice, an intake valve within the channel, and an output valve proximate to the output port. A pressure valve can be between the intake valve and the input port. The apparatus can include a container sealable to the input port.

In another aspect, an apparatus for adding fluid to a fluid system includes a container sealed to an input port of a body forming an internal volume, and a pressure valve in fluid communication with the internal volume.

In another aspect, an apparatus for adding fluid to a fluid system includes a piston extending into a cavity of a body through a piston orifice, a pivot bar having a first end and a second end, the first end being pivotally connected to the body, and a handle pivotally connected to the second end of the pivot bar.

The apparatus can include a connector fluidly connected to the output port capable of fluidly coupling the apparatus to the fluid system. The apparatus can include a suction tube fluidly connected to the channel. The suction tube can extend away from the body and toward the output port. In certain embodiments, the apparatus can include a retaining rod connected to the cavity and extending into a retaining slot in the piston.

The apparatus can include a handle pivotally connected to the body. The handle can be pivotally connected to the piston. The apparatus can include a handle brace connected to the body. The handle and the handle brace can extend away from the body in substantially the same direction.

The apparatus can include a container. The suction tube can extend from the channel and through the input port and into the container. The container can be threadably connected to a threaded input port. The length and configuration of the suction tube can be unique to each container size based on the height and diameter of the container. A fluid receiving end of the suction tube can be directed towards the output port. The neck of the container or the input port can have a Society of Plastics Industry designation of 24–410. The container can be made of a high density polyethylene, a medium density polyethylene, a low density polyethylene, polyethylene terephthalate, or a polypropylene. The container can be cylindrical, can have a concave bottom, and can come in various volumetric sizes. The container can have an eight fluid ounce, four fluid ounce or two fluid ounce nominal capacity.

In another aspect, a method for introducing fluid into a fluid system includes transferring a fluid from a container into a cavity of a fluid delivery apparatus, thereby w reducing pressure in the container, introducing the fluid from the cavity into the fluid system, and equalizing pressure within the container to ambient pressure. The fluid delivery apparatus can include a pressure valve to equalize pressure in the container. Transferring can include moving fluid into the cavity by actuating a handle. A pressure valve can equalize the pressure in the internal volume. Equalizing pressure can include equalizing to atmospheric pressure.

Other features and advantages of the apparatus will be apparent from the description and drawings, and from the claims.

DESCRIPTION OF DRAWINGS

Like reference symbols in the various drawings indicate like elements.

DETAILED DESCRIPTION

Figure 1:
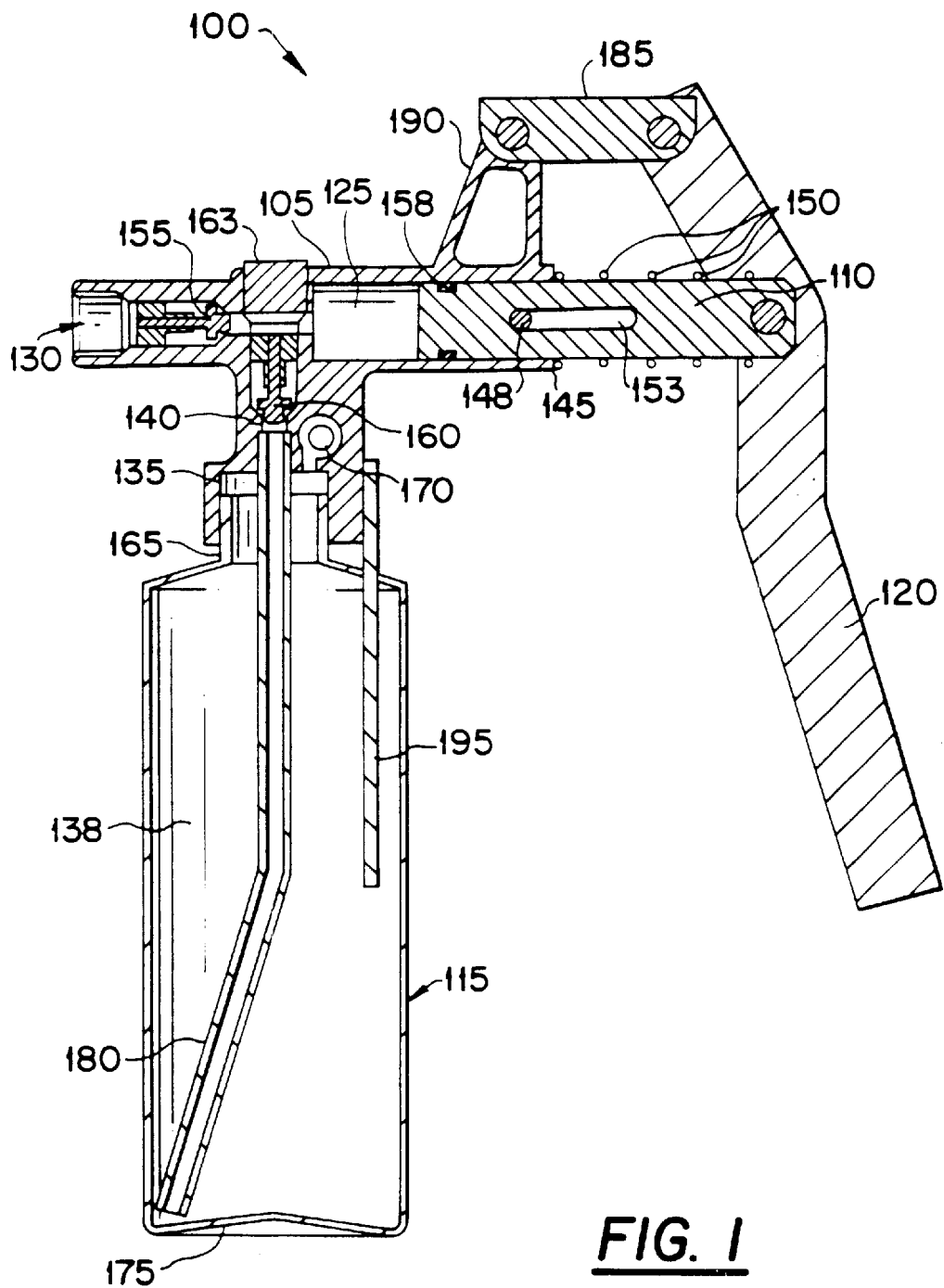
FIGS. 1–2 are schematic diagrams depicting cut-away views of a fluid delivery apparatus.

Referring to FIG. 1, an apparatus 100 for delivering fluid into a fluid system includes a body 105, a piston 110 and a handle 120. The body 105 includes a cavity 125, an output port 130, an input port 135, a channel 140 and a piston orifice 145. The cavity 125 can be a volume fluidly connected to the output port 130, the channel 140 and the piston orifice 145.

An output valve 155 can be inserted in the cavity 125 near the output port 130. The output valve can be a one way or check valve biased in a closed position that allows fluid to flow, in one direction, out of the cavity 125. The output port 130 can allow attachment of a connector (not shown), for example, a hose capable of fluidly connecting to a fluid system. For example, the output port 130 can include a quick-connect or threaded fitting which mates with a complementary fitting on the hose.

The input port 135 can be fluidly connected to the body 105 by the channel 140. The input port 135 can be attachable to a container 115 to form an internal volume 138. For example, the input port 135 can include threads that threadably attach to threads on a neck 165 of the container 115. The container 115 can be a square, rectangular, cylindrical or rounded vessel that can be filled with a fluid. The container 115 includes bottom 175 that can be flat or slightly concave. The container 115 can have a volume of 2 to 24 fluid ounces, for example, 2, 4 or 8 fluid ounces, and the cavity 125 can have a volume of 1/16 to 1/4 fluid ounce, for example, 1/8 fluid ounce.

Figure 4:
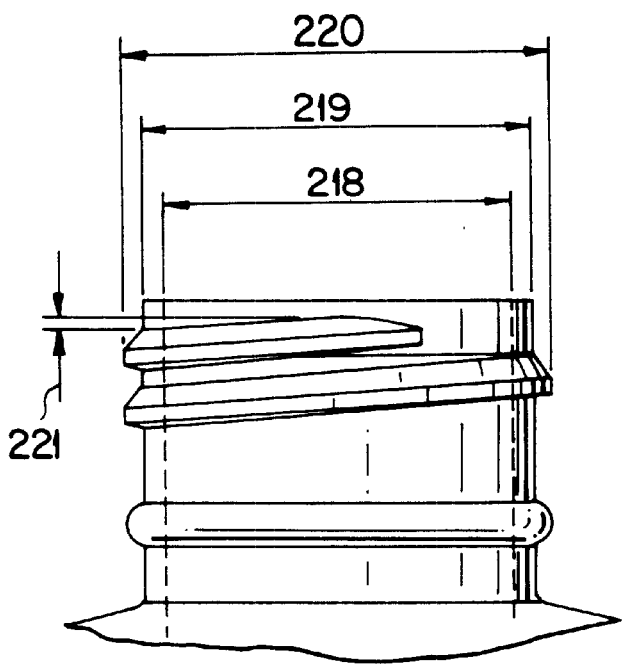
FIG. 4 is a schematic diagram of a neck of a container.
Figure 5:
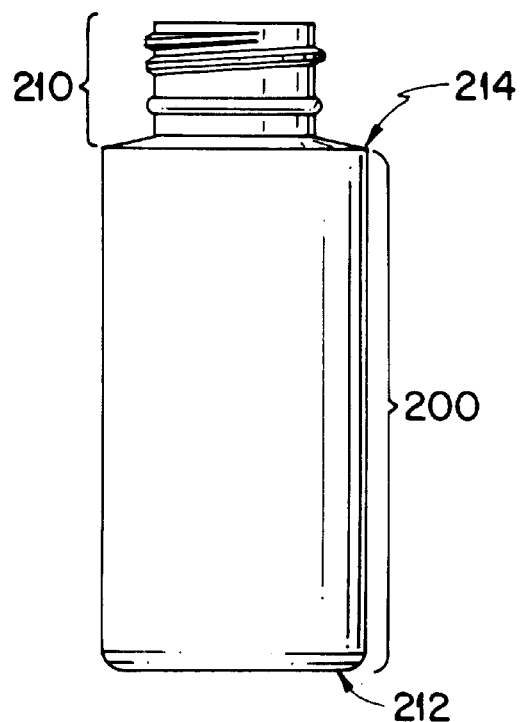
FIG. 5 is a schematic diagram of an example of a container.

Referring to FIGS. 4 and 5, an example of a container 115 having a nominal capacity of eight fluid ounces can include a body 200 and a neck 210. The body can have a height from container bottom 212 to neck bottom 214 of 135 mm and an outer diameter of 50.8 mm. The neck 210 can have a height of 21 mm. The inner orifice diameter 218 at the top of the neck can be 19.2 mm with an outer diameter 219 of 21.5 mm and a thread diameter 220 of 23.7 mm. The neck 210 can be threaded at 8 threads per inch (tpi) with a pitch of 3.18 mm and a helix angle 221 of 2°34' so that the container can be threadably connected to the input port 135. The neck can have a Society of Plastics Industry designation of 24-410. The input port can be threaded at a thread density of 8 threads per inch, with an inner diameter of 22 mm and a thread diameter of 24.1 mm in order to threadably connect with the neck. Similarly, a four fluid ounce nominal capacity container can have an analogous, yet shorter, neck configuration having a height of 16.7 mm, a body height of 100.9 mm and a body diameter of 42.5 mm. A two fluid ounce nominal capacity container can have an analogous neck configuration, a body height of 73.0 mm and a diameter of 35.3 mm.

An intake valve 160 can be located within the channel 140. The intake valve 160 can be a one way or check valve biased in a closed position that allows fluid to flow, in one direction, from the container 115 to pass through the channel 140 and into the cavity 125. An access plug 163 can be located on the body 105 to access the intake valve 160.

The body 105 can include a pressure valve 170. The pressure valve 170 can be located on the channel 140 between the input port 135 and the intake valve 160. In another implementation, the pressure valve 170 can be on the container 115. The pressure valve 170 can include a one way or check valve biased in a closed position that allows ambient air pressure to flow into the channel 140 to equalize pressure in the container 115 as fluid is transferred from the container 115 to the cavity 125. The pressure valve 170 also maintains fluid in the container 115.

A suction tube 180 can be a rounded tube that connects to the channel and extends into the container 115 to the container bottom 175. The suction tube 180 can be directed towards the output port 130, for example, by a bend or an angle directing an end of the suction tube 180 in that direction. Suction tube 180 is attached to the channel 140 and extends through the input port 135 into the container 115. The suction tube can have an outer diameter of 6.00 mm and an inner diameter of 4.00 mm. The suction tube can be specifically designed for each container size to achieve complete, or near complete, fluid removal for each container size. Thus, each separate container size has a different tube length to ensure maximum fluid removal. The bend in the tube prevents the tube from forming a vacuum with the vessel bottom by sealing to the bottom when under suction and at the same time promotes complete emptying of the container. To facilitate maximum fluid removal from the eight fluid ounce nominal capacity cylindrical container described above, the tube can have a length of 162.8 mm, with a 16° bend from vertical directed towards the output port 130 starting at 71.25 mm from a fluid receiving end of the tube. The bend creates an offset of 20.40 mm from vertical towards the output port at the fluid receiving end. The suction tube for the four fluid ounce nominal capacity container described above can be 124.2 mm in height with the 16° bend 55.2 mm from the fluid receiving end of the tube resulting in a 15.8 mm offset from vertical towards the output port. The suction tube for the two 2 fluid ounce nominal capacity container described above can be 102.2 mm in height, with the 16° bend occurring 42.2 mm from the bottom of the tube resulting in a 12.1 mm offset from vertical towards the output port.

The piston 110 can be a cylindrical plunger that fits snugly through the piston orifice 145 and into the cavity 125. The shape of the piston 110 and fit of the piston 110 within the piston orifice 145 allows reciprocating motion of the piston 110 within the cavity 125, while preventing fluid from leaking by the piston 110 and out of the piston orifice 145. A spring 150 can envelope the piston 110 between the handle 120 and the piston orifice 145 that biases the piston 110 in a direction out of the cavity 125.

A retaining rod 148 can be connected to the body 105 inside the cavity 125. A retaining slot 153 can be a cutout or hollow portion of the piston 110 that allows the piston 110 to travel along an axis substantially perpendicular to the retaining rod 148. In one implementation, the retaining slot can extend completely through the piston 110 and the retaining rod 148 connects to the body 105 in two locations. In other implementations, the retaining slot 153 can be a groove extending partly into the piston 110 and the retaining rod 148 extends into the groove. A sealing ring 158 on the piston 110 can form a seal with the piston orifice 145 and can prevent leakage of fluid from the cavity 125.

Figure 2:
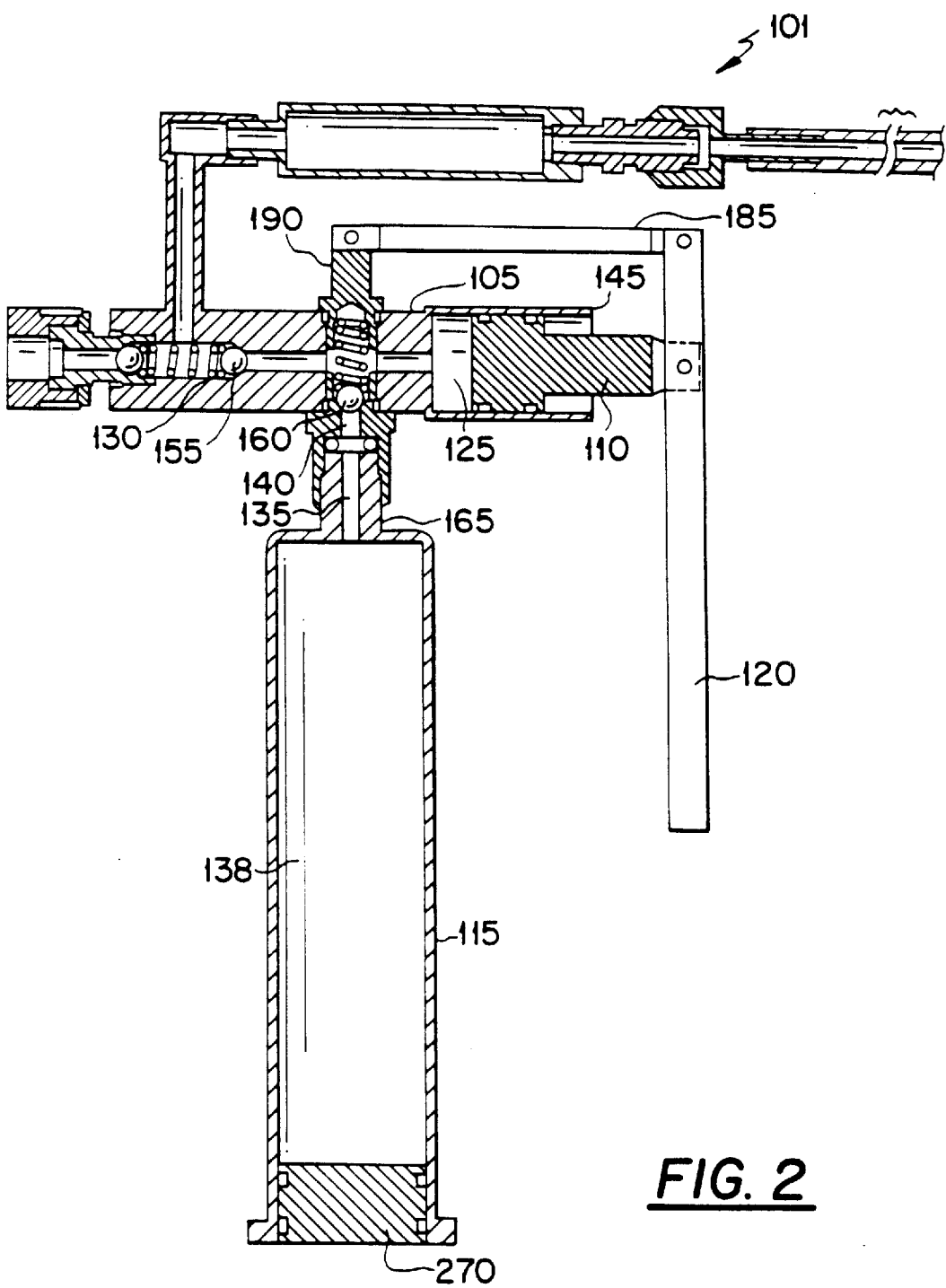

Referring to FIG. 2, fluid delivery apparatus 101 includes a body 105, a piston 110, a container 115 with an internal volume 138, a handle 120, a cavity 125, an output port 130, a channel 140, a piston orifice 145, an output valve 155 and an intake valve 160 as configured and described above with respect to FIG. 1. In FIG. 2, the internal volume 138 of the container 115 can decrease by movement of a plug 270 slideably installed within an end of the container 115. The plug 270 compensates for a decrease in fluid volume when fluid is transferred from the container 115 to the cavity 125 by sliding into the container 115.

Referring to FIGS. 1 and 2, the handle 120 can pivotally attach to the piston 110 and to a pivot bar 185 that pivotally attaches to the body 105 by, for example, an extension member 190 on the body 105. Referring to FIG. 1, a handle brace 195 can be connected to support the apparatus 100 while operating the handle 120.

Figure 3:
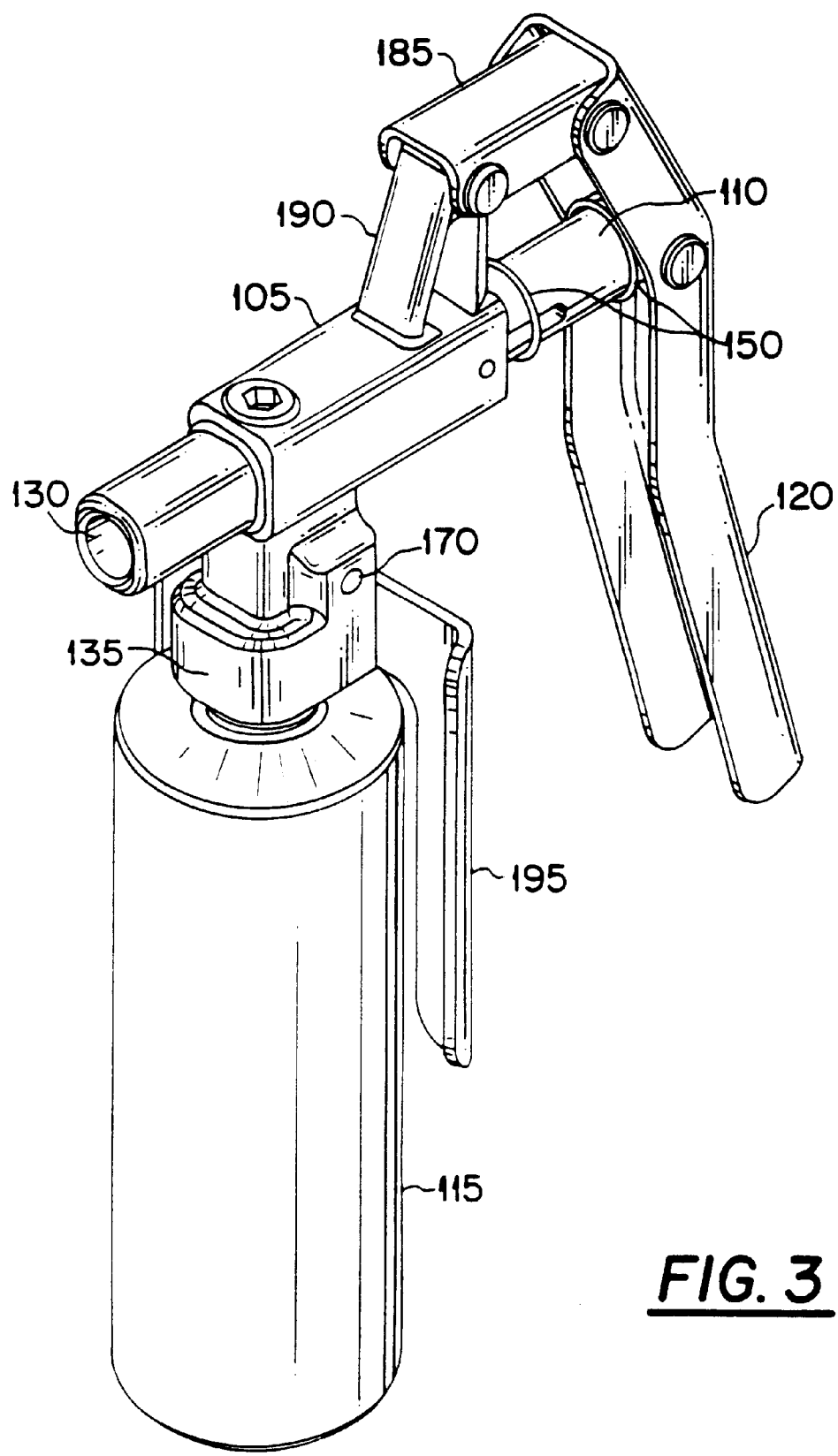
FIG. 3 is a perspective diagram depicting a fluid delivery apparatus.

Referring to FIG. 3, a perspective view of the apparatus 100 as shown in FIG. 1 includes a body 105, a piston 110, a handle 120, an output port 130, an input port 135, a spring 150, a pressure valve 170 a pivot bar 185, an extension member 190, and a handle brace 195.

The components of the apparatus 100 can be made from cast, machined or molded rigid materials, such as metal or plastic.

A method for using the apparatus to add fluid into a fluid system includes transferring fluid from the container 115 into the cavity 125, thereby reducing pressure in the container, introducing the fluid from the cavity into the fluid system, and equalizing pressure within the container 115 to ambient pressure.

Transferring fluid from the container into the cavity can include filling the container 115 with fluid, attaching the container 115 to the channel 140 and operating the handle 120 to move the piston 110 out of the cavity 125, creating lower pressure in the cavity 125. Fluid is drawn from the container 115 into the suction tube 180, passing through the intake valve 160 in the channel 140 and into the cavity 125.

Introducing the fluid from the cavity into the fluid system can include attaching the output port 130 to a fluid system with a connector, such as a hose, and moving the handle 120 to drive the piston 110 into the cavity 125. The decreased volume in the cavity 125 causes the fluid in the cavity 125 to flow from the cavity 125 through the output valve 155, passing through the output port 130, and into the fluid system. Release of the handle 120 causes the cavity 125 to be filled with the fluid since a spring 150 biases the handle in to draw the piston 110 out of the piston orifice 145.

Equalizing pressure within the container to ambient pressure can include actuation of the pressure valve 170 to equalize pressure in the container 115. The reduced pressure in the container can actuate the pressure valve 170 and permit gas, for example, air from the atmosphere, to enter the container 115. Once the pressure has been equalized, the pressure valve 170 closes, which can maintain the fluid in the container 115. Equalizing can occur during or after transferring of the fluid.

The apparatus can be utilized to add fluid to a fluid system. The fluid system can be a closed system or an open system. The system can be a lubricating, braking, heating, air conditioning or other hydraulic system. The system can be a component of a mobile vehicle, such as an automobile. The closed system can be an assembled system. The open system, can be an unassembled or disassembled system. The fluid can include a lubricant, a dye, such as a leak detection dye, or other system additive. For example, in one implementation the fluid can include a leak detection dye that is added to an air conditioning or climate control system in an automobile. The leak detection dye can be a naphthalimide, a thioxanthane or other emissive organic compound.

A number of implementations of a fluid delivery apparatus have been described. Nevertheless, it will be understood that various modifications can be made without departing from the spirit and scope of the fluid delivery apparatus. For example, the piston can be actuated by operation of an electric motor, by pneumatic pressure or by hydraulic pressure. Accordingly, other implementations are within the scope of the following claims.

What is claimed is:

1. An apparatus for adding fluid to a fluid system comprising:
    a body having a cavity, an output port fluidly connected to the cavity, a threaded input port fluidly connected to the cavity by a channel, and a piston orifice fluidly connected to the cavity;
    a piston extending into the cavity through the piston orifice;
    an intake valve within the channel;
    an output valve proximate to the output port; and
    a pressure valve between the intake valve and the input port.

2. The apparatus of claim 1, further comprising a handle pivotally connected to the body.

3. The apparatus of claim 2, wherein the handle is pivotally connected to the piston.

4. The apparatus of claim 1, further comprising a suction tube fluidly connected to the channel.

5. The apparatus of claim 4, further comprising a container threadably connected to the input port.

6. The apparatus of claim 5, wherein the suction tube extends from the channel, through the input port and into the container.

7. The apparatus of claim 4, wherein the suction tube is directed towards the output port.

8. The apparatus of claim 5, wherein the input port is threaded at a thread density of 8 threads per inch, and has an inner diameter of 22 mm and a thread diameter of 24.1 mm.

9. An apparatus for adding fluid to a fluid system comprising:
    a body having a cavity, an output port fluidly connected to the cavity, an input port fluidly connected to the cavity by a channel, and a piston orifice fluidly connected to the cavity;
    a piston extending into the cavity through the piston orifice;
    an intake valve within the channel;
    an output valve proximate to the output port;
    a container threadably connected to the input port forming an internal volume; and
    a suction tube fluidly connected to the channel.

10. The apparatus of claim 9, further comprising a pressure valve in fluid communication with the internal volume between the intake valve and the input port.

11. The apparatus of claim 9, further comprising a connector fluidly connected to the output port for fluidly coupling the apparatus to the fluid system.

12. The apparatus of claim 9, further comprising a handle pivotally connected to the body.

13. The apparatus of claim 12, wherein the handle is pivotally connected to the piston.

14. The apparatus of claim 12, further comprising a handle brace connected to the body, the handle and the handle brace extending away from the body in substantially the same direction.

15. The apparatus of claim 9, wherein the suction tube extends away from the body and toward the output port.

16. The apparatus of claim 9, wherein the suction tube extends from the channel, through the input port and into the container.

17. The apparatus of claim 9, wherein the container includes a neck, the neck having a thread density of 8 threads per inch, a pitch of 3.18 mm, a helix angle of 2° 34', an outer orifice diameter of 21.5 mm, and a thread diameter of 23.7 mm.

18. The apparatus of claim 9, wherein the container has a neck designated as the Society of Plastics Industry designation of 24–410.

19. The apparatus of claim 9, wherein the container comprises a cylindrical bottle.

20. The apparatus of claim 9, wherein the container has an eight fluid ounce nominal capacity.

21. The apparatus of claim 9, wherein the container has a four fluid ounce nominal capacity.

22. The apparatus of claim 9, wherein the container has a two fluid ounce nominal capacity.

23. The apparatus of claim 15, wherein the container has a nominal capacity of eight fluid ounces, a height of 135 mm, and an outer diameter of 50.8 mm, and the suction tube has an outer diameter of 6 mm and a length of 162.8 mm with a 16° bend from vertical directed towards the output port starting at 71.25 mm from a fluid receiving end of the tube.

24. The apparatus of claim 15, wherein the container has a nominal capacity of four fluid ounces, a height of 100.9 mm, and an outer diameter of 42.5 mm, and the suction tube has an outer diameter of 6 mm and a length of 124.2 mm with a 16° bend from vertical directed towards the output port starting at 55.2 mm from a fluid receiving end of the tube.

25. The apparatus of claim 15, wherein the container has a nominal capacity of two fluid ounces, a height of 73.0 mm, and an outer diameter of 35.3 mm, and the suction tube has an outer diameter of 6 mm and a length of 102.2 mm with a 16° bend from vertical directed towards the output port starting at 42.2 mm from a fluid receiving end of the tube.

26. A method for introducing fluid into a fluid system comprising:
   transferring a fluid from a container into a cavity of a fluid delivery apparatus, thereby reducing pressure in the container;
   introducing the fluid from the cavity into the fluid system; and
   equalizing pressure within the container to ambient pressure.

27. The method of claim 26, wherein the fluid delivery apparatus comprises a pressure valve to equalize pressure in the container.

28. The method of claim 26, wherein the fluid delivery apparatus includes a body having a cavity, an output port fluidly connected to the cavity, an input port fluidly connected to the cavity by a channel, and a piston orifice, a pivot bar having a first end and a second end, the first end being pivotally connected to the body, and a handle pivotally connected to the second end of the pivot bar, the transferring including moving fluid into the cavity by actuating the handle.

29. The method of claim 26, wherein the fluid delivery apparatus includes a body having a cavity, an output port fluidly connected to the cavity, an input port fluidly connected to the cavity by a channel, the container being sealed to the input port forming an internal volume, a piston orifice, a piston extending into the cavity through the piston orifice, an intake valve within the channel, an output valve proximate to the output port, and a pressure valve in fluid communication with the internal volume, the pressure valve equalizing the pressure in the internal volume.

30. The method of claim 26, wherein the fluid includes a dye.

31. The method of claim 30, where the dye is a naphthalimide.

32. The method of claim 26, wherein the fluid includes a lubricant.

33. The method of claim 26, wherein the fluid system is a heating, ventilating, or air conditioning system.

34. The method of claim 26, wherein equalizing pressure includes equalizing to atmospheric pressure.

35. The method of claim 29, wherein the container includes a neck, the neck having a thread density of 8 threads per inch, a pitch of 3.18 mm, a helix angle of 2° 34', an outer orifice diameter of 21.5 mm, and a thread diameter of 23.7 mm.

36. The method of claim 29, wherein the container has a neck designated as the Society of Plastics Industry designation of 24–410.

37. The method of claim 29, wherein the container has a nominal capacity of eight fluid ounces, a height of 135 mm, and an outer diameter of 50.8 mm, and the suction tube has an outer diameter of 6 mm and a length of 162.8 mm with a 16° bend from vertical directed towards the output port starting at 71.25 mm from a fluid receiving end of the tube.

38. The method of claim 29, wherein the container has a nominal capacity of four fluid ounces, a height of 100.9 mm, and an outer diameter of 42.5 mm, and the suction tube has an outer diameter of 6 mm and a length of 124.2 mm with a 16° bend from vertical directed towards the output port starting at 55.2 mm from a fluid receiving end of the tube.

39. The method of claim 29, wherein the container has a nominal capacity of two fluid ounces, a height of 73.0 mm, and an outer diameter of 35.3 mm, and the suction tube has an outer diameter of 6 mm and a length of 102.2 mm with a 16° bend from vertical directed towards the output port starting at 42.2 mm from a fluid receiving end of the tube.

40. A method of introducing fluid into a fluid system comprising:
   transferring a fluid from a container having an internal volume into a cavity of a fluid delivery apparatus through an intake valve, thereby reducing pressure in the container;
   introducing the fluid from the cavity through an output valve into the fluid system; and
   equalizing pressure within the container to atmospheric pressure with a pressure valve in fluid communication with the internal volume.

* * * * *